(12) United States Patent
Baba et al.

(10) Patent No.: US 7,216,269 B2
(45) Date of Patent: May 8, 2007

(54) SIGNAL TRANSMIT-RECEIVE DEVICE, CIRCUIT, AND LOOPBACK TEST METHOD

(75) Inventors: Takashige Baba, Kodaira (JP); Tatsuya Saito, Kunitachi (JP); Hiroki Yamashita, Hachioji (JP); Yusuke Takeuchi, Hachioji (JP); Satoru Isomura, Hamura (JP)

(73) Assignee: Renesas Technology Corporation, Tokyo (JP)

( * ) Notice: Subject to any disclaimer, the term of this patent is extended or adjusted under 35 U.S.C. 154(b) by 648 days.

(21) Appl. No.: 10/309,886

(22) Filed: Dec. 5, 2002

(65) Prior Publication Data

US 2004/0218665 A1 Nov. 4, 2004

(30) Foreign Application Priority Data

Jan. 9, 2002 (JP) .......................... P2002-001900

(51) Int. Cl.
*G01R 31/28* (2006.01)
(52) U.S. Cl. .................. 714/716; 714/704; 714/748
(58) Field of Classification Search ................ 714/716, 714/704, 798, 715, 48, 748, 736; 370/249, 370/359, 225
See application file for complete search history.

(56) References Cited

U.S. PATENT DOCUMENTS 3,879,577 A * 4/1975 Progler ..................... 178/23 A
4,686,668 A * 8/1987 Koseki et al. ............... 370/249
5,787,114 A 7/1998 Ramamurthy et al.
5,790,563 A * 8/1998 Ramamurthy et al. ...... 714/736
5,956,370 A * 9/1999 Ducaroir et al. ............ 375/221
6,005,696 A * 12/1999 Joline et al. .................. 398/25
6,560,727 B1 * 5/2003 Pierson et al. .............. 714/704

* cited by examiner

*Primary Examiner*—Albert Decady
*Assistant Examiner*—Fritz Alphonse
(74) *Attorney, Agent, or Firm*—Reed Smith LLP; Stanley P. Fisher, Esq.; Juan Carlos A. Marquez, Esq.

(57) ABSTRACT

A signal transmit-receive device of the invention reduces the number of high-speed signal lines required for connecting a transmitting circuit group and a receiving circuit group, and for running a loopback test on a signal transmit-receive device. The loopback test circuit uses an error detecting circuit, a test signal producing circuit, and a wiring for transmitting error information. The error detecting circuit compares a test signal pattern defined in advance by a first communication device and a received signal pattern. The test signal producing circuit produces the test signal pattern based on error information. If an error is detected, the error signal is transmitted to the test signal producing circuit through the wiring. The test signal producing circuit produces a predetermined test signal pattern if the error signal DE has an L level; upon receiving H level, it sends back the predetermined test signal pattern to the first communication device.

6 Claims, 8 Drawing Sheets

SIGNAL TRANSMIT-RECEIVE DEVICE, CIRCUIT, AND LOOPBACK TEST METHOD

BACKGROUND OF THE INVENTION

1. Field of the Invention

The present invention relates to a method for confirming the accuracy of communications performed in a signal transmit-receive device using optical or electrical signals. More particularly, it relates to a method of loopback tests run between a communication device and a signal transmit-receive device.

2. Description of the Related Art

Conventionally, an optical or electrical signal transmit-receive device in which a transmitting circuit and a receiving circuit are paired have been used in an exchange, router and like used for signal communications. In such a signal transmit-receive device, to test the accuracy of communications transmissions, a test signal is looped from a communication device through a transmitting circuit and a receiving circuit and back to the communication device without processing. The communication device compares a second, transmitted test signal with the test signal looped back from the signal transmit-receive device to determine the accuracy of transmitted communications signal. This test method is referred to as the loopback test method. A method of the prior art is disclosed in, e.g., U.S. Pat. No. 5,787,114.

Figure 10:
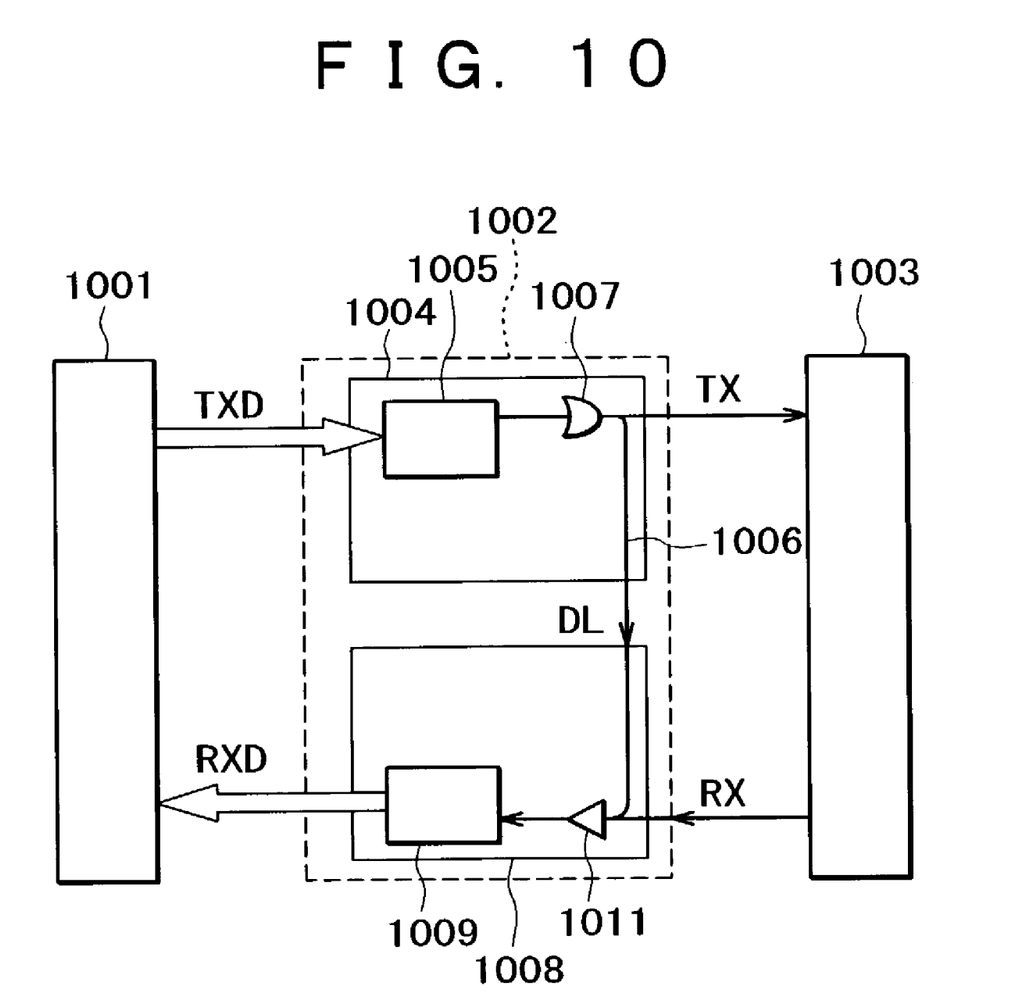
FIG. 10 is a block diagram showing a basic configuration of a conventional signal transmit-receive circuit.

Referring to FIG. 10, the problems of the conventional loopback method are described. In FIG. 10, a communication device 1001 transmits and receives parallel signals, a communication device 1003 transmits and receives serial signals, and a signal transmit-receive device 1002 performs mutual conversion of parallel signals and serial signals between the two communication devices to transmit the signals. A transmitting circuit 1004 and a receiving circuit 1008 are formed on ICs different from each other. A serializer 1005 converts parallel signals into serial signals, a transmitting driver 1007 drives a serial signal TX, an input buffer 1011 receives a serial signal RX, and a deserializer 1009 converts serial signals into parallel signals. In the signal transmit-receive device, during normal communication, a parallel signal TXD transmitted from the communication device 1001 is converted into a serial signal TX, which is transmitted to the communication device 1003. Conversely, a serial signal RX transmitted from the communication device 1003 is converted into a parallel signal RXD, which is transmitted to the communication device 1001. During a loopback test, a test signal transmitted from the communication device 1001 is converted by the serializer 1005 into an output signal TX, which is looped back to the communication device 1001 without processing, through the wiring 1006 for connecting the transmitting circuit 1004 and the receiving circuit 1008, and the deserializer 1009.

However, this conventional method requires that a signal of the same quantity as the test signal be fed between a transmitting circuit group and a receiving circuit group. This requires a circuit configuration for signal transfer and transfer time. Particularly, where the signal transmit-receive device must be constituted by different modules or ICs for a transmitting circuit group and a receiving circuit group, a circuit having the same transmission speed as a data signal for connecting the transmitting circuit group and the receiving circuit group is required to loop back a signal. Recent data signals generally have a high transmission speed over 1 Gbps, and high-speed signal lines and integrated circuit (IC) pins are required for connection between the transmitting circuit group and the receiving circuit group. However, high-speed signal lines and IC pins are generally more expensive than low-speed signal lines and IC pins, inviting an increase in installation costs. Also, an increased number of signal lines requires additional input-output circuits and invites an increase in power consumption. Use of inexpensive signal lines and IC pins is not feasible, however, since signal transmission rates would be unacceptably slow thereby degrading device performance.

SUMMARY OF THE INVENTION

The present invention reduces overhead caused by transferring a test signal without processing within a device in conventional loopback tests. To be more specific, the present invention provides a device that reduces the number of high-speed signal lines for connecting a transmitting circuit group and a receiving circuit group, required to run a loopback test, and reduces installation costs and power consumption.

The present invention provides a loopback test method by which a signal transmit-receive device having a transmitting circuit and a receiving circuit tests the status of communication with other communication devices. Instead of looping a test signal transmitted from a communication device through a receiving circuit and a transmitting circuit and back to the communication device without processing, a preferred test method of the present invention comprises: a first step for evaluating a transmit state of the test signal in the receiving circuit; a second step for transmitting an evaluation result signal based on the evaluation from the receiving circuit to the transmitting circuit; and a third step for the receiving circuit to send the test signal or a signal different from the test signal back to the communication device, based on the evaluation result.

In the first step, the receiving circuit compares the test signal sent from the communication device with a predetermined correct test signal to evaluate a transmit state (e.g., error rate) of the test signal. In the second step, an information quantity of the evaluation result signal is smaller than that of the test signal. In the third step, the transmitting circuit inverts at least one bit of a predetermined correct test signal, e.g., based on the evaluation result, to produce a signal different from the test signal and sends it back to the communication device. The communication device determines a communication state by detecting whether the sent-back test signal is a correct test signal.

The signal transmit-receive device may have a function to convert a parallel signal sent from a communication device into a serial signal and transfer the serial signal to another communication device. In this case, a test signal can be a parallel signal. An evaluation result signal preferably has a smaller quantity of information than a test signal, and may be, for example, one-bit signal indicating whether the test signal is correct or incorrect. If the receiving circuit and the transmitting circuit are formed on different chips, the one-bit evaluation result signal can be transferred between one pin of one of the chips and one pin of another. If an evaluation result signal having a lower transfer speed than the test signal is used, an inexpensive circuit may be used for the signal. This can be achieved, for example, by making the pulse width of the evaluation result signal wider than that of the test signal.

According to another preferred aspect of the present invention, the signal transmit-receive device includes a first circuit for receiving signals and a second circuit for transmitting signals, wherein the first circuit detects whether an inputted test signal pattern is erroneous, and if an error is detected, transmits an error signal indicating an error to the second circuit, and the second circuit sends a correct test signal pattern or an incorrect test signal pattern, based on the error signal.

As a concrete example, the first circuit receives a parallel signal having a parallelism factor of a (a≧1), the second circuit issues a parallel signal having a parallelism factor of b (b≧1), an error signal is a serial signal or a parallel signal having a parallelism factor of c (a>c, b>c). Ordinarily, a and b may be equal to each other.

More specifically, (1) the signal transmit-receive device of the present invention is a signal transmit-receive device using optical or electrical signals that performs mutual conversion between signals having a parallelism factor of n (n≧1) and signals having a parallelism factor of m (m≧1) between communication devices to perform transmission and reception, the signal transmit-receive device comprising a transmitting circuit group for converting signals having a parallelism factor of n into signals having a parallelism factor of m and transmitting the converted signals and a receiving circuit group for converting signals having a parallelism factor of m into signals having a parallelism factor of n and transmitting the converted signals, wherein the transmitting circuit group includes an error detecting circuit for detecting an error of test signals sent from a communication device; the receiving circuit group includes a test signal producing circuit comparable to that of a communication device; there is provided a circuit that transmits information of an error detected in the error detecting circuit of the transmitting circuit group to the receiving circuit group at a lower speed than a signal transmission speed; and there is provided a loopback function that produces a test signal containing the error by the test signal producing circuit, based on the error information, and sends the test signal back to the communication device.

(2) The signal transmit-receive device described in (1) has a circuit that detects in the error detecting circuit the existence or absence of an error in the test signal received in the transmitting circuit group, and transmits one-bit information indicating the existence or absence of an error from the transmitting circuit group to the receiving circuit group, and has a loopback function that produces, from the information indicating the existence or absence of an error, a test signal containing the existence or absence of an error in the test signal producing circuit of the receiving circuit group, and sends the test signal back to the communication device.

(3) The signal transmit-receive device described in (1) has a circuit that detects in the error detecting circuit the number of error bits in the test signal received in the transmitting circuit group, and transmits information indicating the number of error bits from the transmitting circuit group to the receiving circuit group, and has a loopback function that produces; from the information indicating the number of error bits, a test signal containing the same number of error bits as the received signal in the test signal producing circuit of the receiving circuit group, and sends the test signal back to the communication device.

(4) The signal transmit-receive device described in (1) has a circuit that detects in the error detecting circuit the positions of error bits in the test signal received in the transmitting circuit group, and transmits information of error bit positions from the transmitting circuit group to the receiving circuit group, and has a loopback function that produces, from the information of error bit positions, a test signal containing the same error bit positions as the received signal in the test signal producing circuit of the receiving circuit group, and sends the test signal back to the communication device.

(5) The signal transmit-receive device described in (1) has a circuit that detects in the error detecting circuit an error from the test signal received in the transmitting circuit group, and transmits information about the error from the transmitting circuit group to the receiving circuit group over a bit serial signal having a speed lower than a signal transmission speed, and has a loopback function that reproduces, from the information of the error, a test signal containing the same error as the received signal in the test signal producing circuit of the receiving circuit group, and sends the test signal back to the communication device.

(6) The signal transmit-receive device described in (1) to (5) has a circuit that transmits a timing signal of the test signal received in the transmitting circuit group from the transmitting circuit group to the receiving circuit group, and has a loopback function that produces a test signal containing error information synchronous with the received test signal in the test signal producing circuit, based on the timing signal, and sends the test signal back to the communication device.

(7) The signal transmit-receive device described in (1) to (6) has a loopback function capable of determining whether an error occurrence location is in the transmitting circuit or the receiving circuit by controlling error information transmission in a circuit that transmits error information from the transmitting circuit group to the receiving circuit group.

BRIEF DESCRIPTION OF THE DRAWINGS

This invention is to be described specifically for preferred embodiments with reference to the drawings. Throughout the drawings for explaining the preferred embodiments, those having identical functions carry the same reference numerals, for which duplicate explanations have been omitted, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description the preferred embodiments of the present invention will be provided herein below with reference to the attached drawings.

Figure 1:
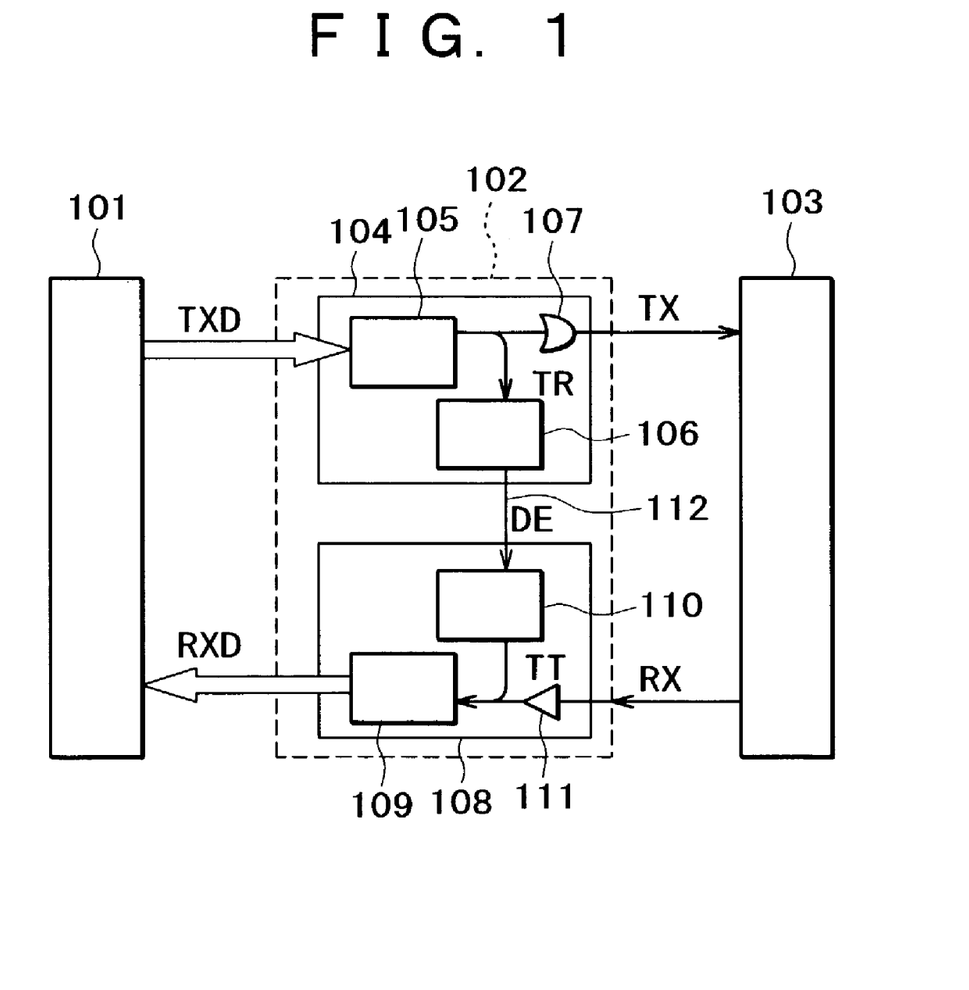
FIG. 1 is a block diagram showing a basic configuration of a signal transmit-receive circuit of the present invention.

FIG. 1 is a drawing showing a basic configuration of a communication device and a signal transmit-receive device of the present invention. In this drawing, a communication device 101 transmits and receives parallel signals, a communication device 103 transmits and receives serial signals, and a signal transmit-receive device 102 performs conversion of parallel signals and serial signals between the two communication devices to transmit and receive the signals. As a loopback test method in the configuration of this example, loopback between the communication device 101 and the signal transmit-receive device 102, and loopback between the communication device 103 and the signal transmit-receive device 102 are possible. In FIG. 1, however, only a loopback test between the communication device 101 and the signal transmit-receive device 102 is shown for simplicity.

In this example, in the signal transmit-receive device 102, the transmitting circuit group and receiving circuit group of a transmitting integrated circuit 104 and a receiving circuit 108 are respectively formed on different ICs. The transmitting circuit 104 comprises a serializer 105 for converting parallel signals into serial signals, and a transmitting driver 107 for driving a serial signal TX, while the receiving circuit comprises an input buffer 111 for receiving a serial signal RX, and a deserializer 109 for converting serial signals into parallel signals. During normal communication, that is, during a non-loopback test, a parallel signal TXD transmitted from the communication device 101 is converted into a serial signal TX by the transmitting circuit 104 and transmitted to the communication device 103. Conversely, a serial signal RX transmitted from the communication device 103 is converted into a parallel signal RXD by the receiving circuit 108 and transmitted to the communication device 101.

In this example, a preferred loop back test circuit according to the present invention comprise an error detecting circuit 106 within the transmitting circuit 104, a test signal producing circuit 110 within the receiving circuit 108, and a wiring 112 for transmitting error information from the transmitting circuit 104 to the receiving circuit 108. The error detecting circuit 106 compares a test signal pattern, defined in advance by the communication device 101, with a received signal pattern (TR), and so detects errors. This comparison method is a sequential basis. On the other hand, the test signal producing circuit 110 produces a test signal pattern, defined in advance by the communication device 101, and can invert any bits of the test signal pattern based on error information.

Figure 2:
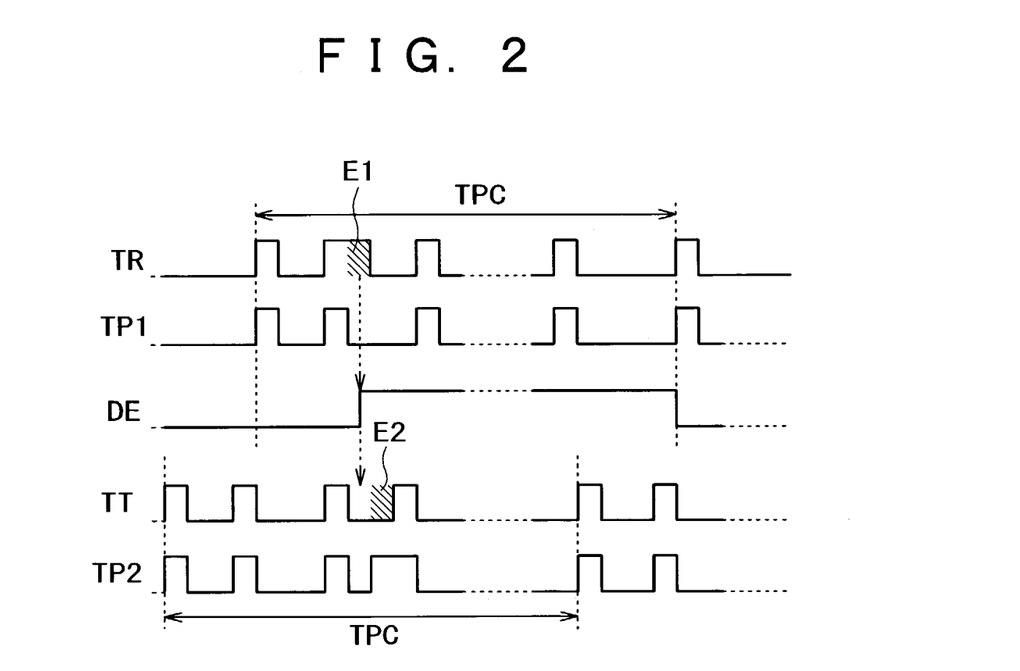
FIG. 2 is a first waveform diagram showing a signal timing relationship during a loopback test on the signal transmit-receive circuit of FIG. 1.

Referring to FIG. 2, a description is made of the operation of a loopback test of the present invention in a case where information indicating the existence or absence of an error is transmitted from the transmitting circuit 104 to the receiving circuit 108. TP1 and TP2 denote test signal patterns defined in advance by the communication device 101. A signal TR received in the transmitting circuit 104 is compared with TP1 in the error detecting circuit 106, and mismatch between the two, if any, is detected as an error, as indicated by E1. If an error is detected in the error detecting circuit 106, H level is outputted to an error signal DE. The error signal DE is transmitted to the test signal producing circuit 110 of the receiving circuit 108 through the wiring 112. The test signal producing circuit 110 produces a test signal pattern TP2 defined with the communication device 101 if the error signal DE from the transmitting circuit 104 is L level. Upon receiving an error signal DE of H level, the test signal producing circuit 110 produces a signal TT in which one bit (E2) in the test signal pattern TP2 is inverted. Since the signal TT is transmitted to the communication device 101, it can be tested by the loopback test whether an error occurs in the loopback route between the communication device 101 and the signal transmit-receive circuit 102. The transmission speed of the error signal DE can be set about as low as one cycle time (Time Pattern Cycle (TPC)) of the test signal pattern. Therefore, a low-speed wiring and IC pins can be used to connect the transmitting circuit 104 and the receiving circuit 108, contributing to reduction in installation costs.

Figure 3:
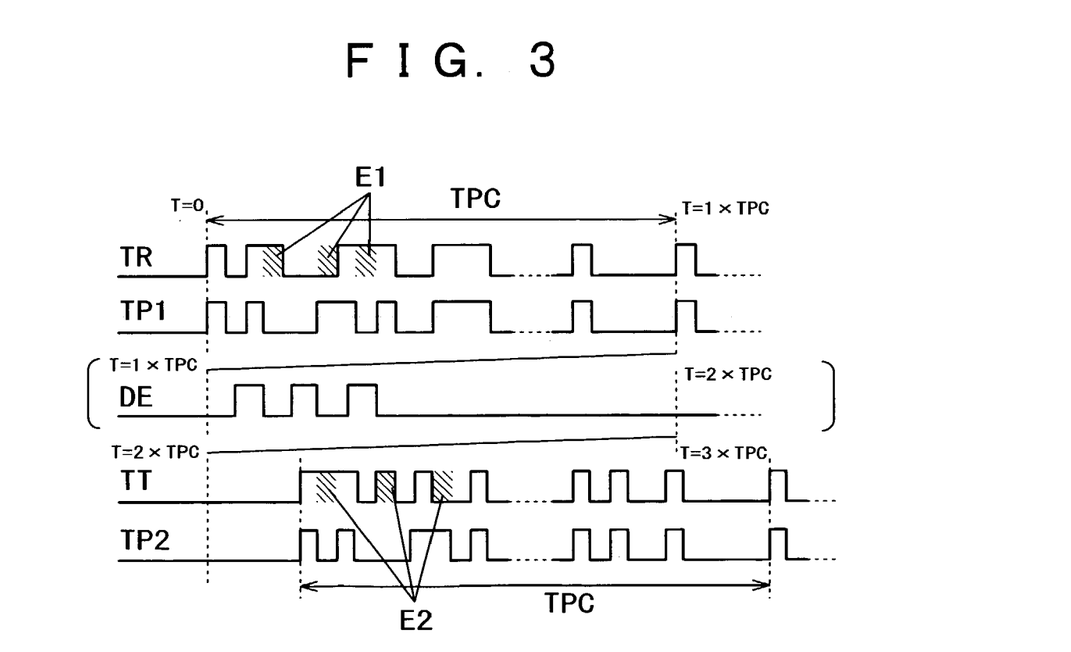
FIG. 3 is a second waveform diagram showing a signal timing relationship during a loopback test on the signal transmit-receive circuit of FIG. 1.

Referring to FIG. 3, with the same device configuration as that in FIG. 1, a description is made of an example of loopback test operation in a case where the number of errors is transmitted as error information from the transmitting circuit 104 to the receiving circuit 108. TP1 and TP2 denote test signal patterns defined in advance by the communication device 101. A signal TR received in the transmitting circuit 104 is compared with TP1 in the error detecting circuit 106, and mismatch between the two, if any, is detected as an error, as indicated by E1, and the number of errors within one cycle of the test signal pattern is counted by a counter of the error detecting circuit 106. In the next cycle of the test signal pattern TR, an error signal DE in which L and H levels are repeated, for example, by the number of errors, is outputted, and transmitted to the test signal producing circuit 110 of the receiving circuit 108 through the wiring 112. In the example of FIG. 3, there are three errors E1, so that the error signal DE has L and H levels repeated three times. The test signal producing circuit produces a signal TT in which bits (E2) of TP2 are inverted by the number of errors transmitted by the error signal DE. Since the signal TT is transmitted to the communication device 101, the number of errors in the loopback route can be tested by the loopback test. The quantity of signals transmitted to the transmitting circuit 104 and the receiving circuit 108 can be compressed to twice the number of error bits, so that the transmission speed of the error signal DE can be set lower than that of transmit-receive signals. Therefore, a low-speed wiring and IC pins can be used to connect the transmitting circuit 104 and the receiving circuit 108, contributing to reduction in installation costs. In FIG. 3, a difference in time relationship among signals (TR, TP1), DE, and (TT, TP2) is shown, as indicated by time T. The time scale of the signal DE is set shorter than that of other signals. In this example, to transmit the number of errors, a method is used which preferably repeats L and H levels by the number of errors. However, any method capable of transmitting the number of errors may be used, such as a method for transmitting the number of errors by a 2-bit signal of a binary signal and a clock signal.

Figure 4:
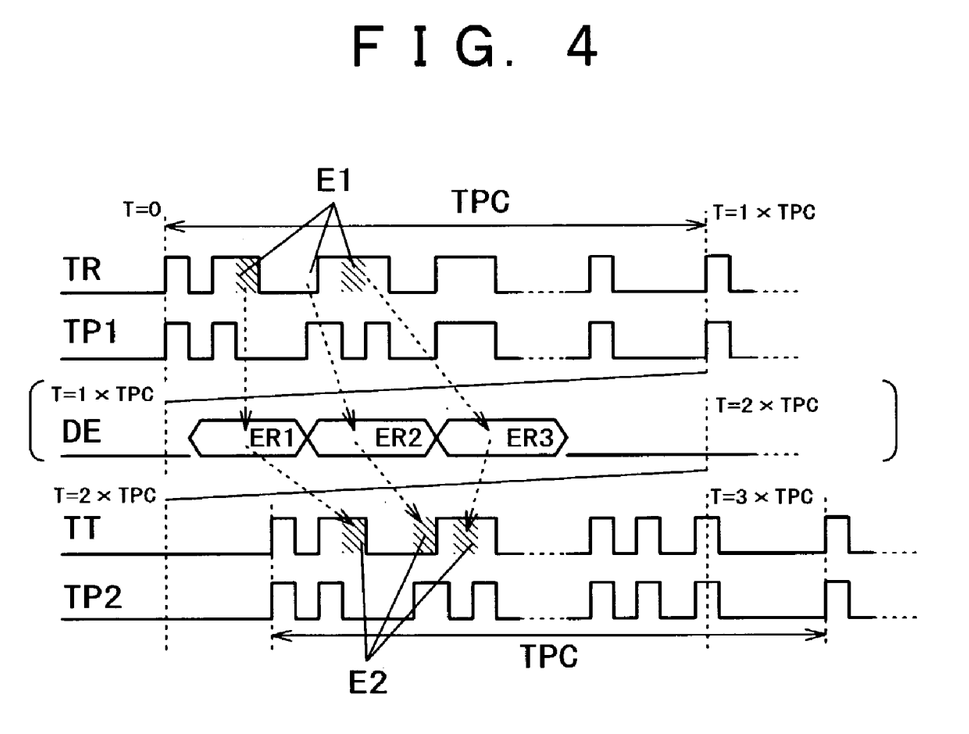
FIG. 4 is a third waveform diagram showing a signal timing relationship during a loopback test on the signal transmit-receive circuit of FIG. 1.

Referring to FIG. 4, with the same device configuration as that in FIG. 1, a description is made of an example of loopback test operation in a case where error positions in a test signal pattern are transmitted as error information from the transmitting circuit 104 to the receiving circuit 108. TP1 and TP2 denote test signal patterns defined in advance by the communication device 101. A signal TR received in the transmitting circuit 104 is compared with TP1 in the error detecting circuit 106, and mismatch between the two, if any, is detected as an error, as indicated by E1, and error positions on the test signal pattern are recorded in a memory within the error detecting circuit 106. At the next cycle of the test signal pattern TP1, an error signal DE containing error position information is outputted and transmitted to the test signal producing circuit of the receiving circuit 110 through the wiring 112. In the example of FIG. 4, there are three errors E1, so that the error signal DE consists of the respective position information data sets ER1, ER2, and ER3 of the errors. The test signal producing circuit 110 produces a signal TT in which bits (E2) of TP2 are inverted, based on the error signal DE, to represent the error position information. Since the signal TT is transmitted to the communication device 101, a loopback test representative of error positions can be run. The quantity of signals transmitted to the transmitting circuit 104 and the receiving circuit 108 can be compressed to nearly the product of the number of errors multiplied by binary notation of the number of bits of the test signal pattern, so that the transmission speed of the error signal DE can be set lower than that of transmit-receive signals. Therefore, like the above example, a low-speed wiring and IC pins can be used to connect the transmitting circuit 104 and the receiving circuit 108, contributing to reduction in installation costs. In FIG. 4, a difference in time relationship among signals (TR, TP1), DE, and (TT, TP2) is shown, as indicated by T. The time scale of the signal DE is set shorter than that of other signals.

Figure 5:
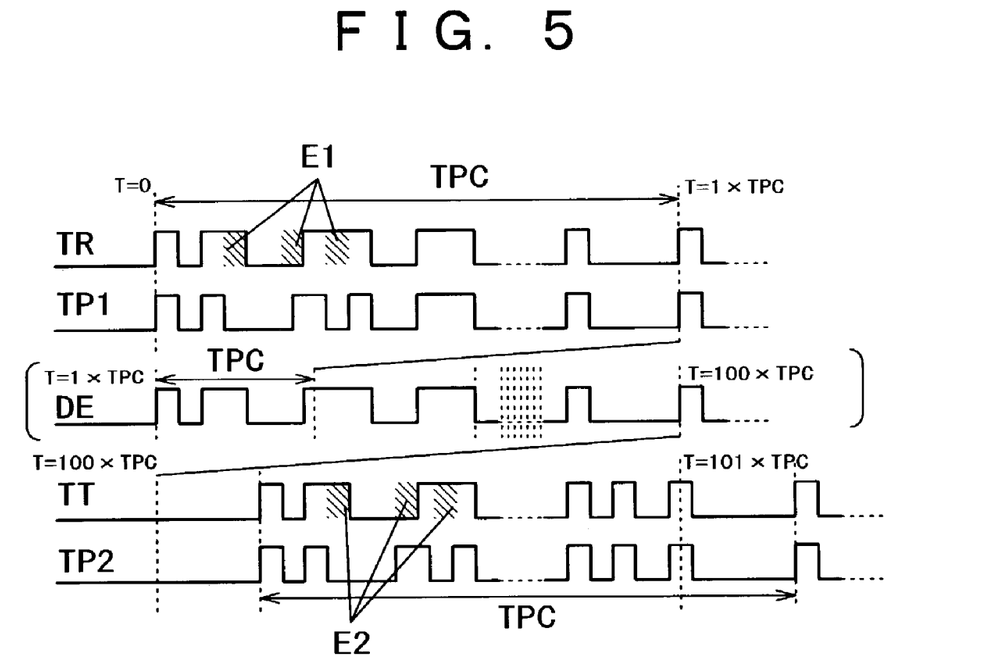
FIG. 5 is a fourth waveform diagram showing a signal timing relationship during a loopback test on the signal transmit-receive circuit of FIG. 1.

Referring to FIG. 5, with the same device configuration as that in FIG. 1, a description is made of an example of loopback test operation in a case where error information is transmitted from the transmitting circuit 104 to the receiving circuit 108 over a bit serial signal slower than signal transmission speed. TP1 and TP2 denote test signal patterns defined in advance by the communication device 101. A signal TR received in the transmitting circuit 104 is compared with TP1 in the error detecting circuit 106, and mismatch between the two, if any, is detected as an error, as indicated by E1, and error information is recorded in a memory within the error detecting circuit 106. At the next cycle of the test signal pattern TP1, an error signal DE is outputted as a bit serial signal slower than the transmission speed of transmit-receive signal and transmitted to the test signal producing circuit 110 of the receiving circuit 108 through the wiring 112. The test signal producing circuit 110 produces a signal TT in which bits (E2) of TP2 are inverted, based on the error signal DE, to reproduce the test signal received in the transmitting circuit 104. In the example of FIG. 5, as the error signal DE, one cycle of the test signal pattern TP1 is transmitted without processing at a one-hundredth speed from the transmitting circuit 104 to the receiving circuit 108. In this case, although a loopback test takes 100 times as long as a signal transmission time from the transmitting circuit 104 to the receiving circuit 108, that is, a cycle time TPC of the test signal pattern TP1, a test signal received in the transmitting circuit 104 can be sent back without processing, as in conventional loopback tests. Since the transmission speed of the error signal DE is lower than that of transmit-receive signals, a low-speed wiring and IC pins can be used to connect the transmitting circuit 104 and the receiving circuit 108, contributing to reduction in installation costs. In FIG. 5, a difference in time relationship among signals (TR, TP1), DE, and (TT, TP2) is shown, as indicated by time T. The time scale of the signal DE is set shorter than that of other signals.

Figure 6:
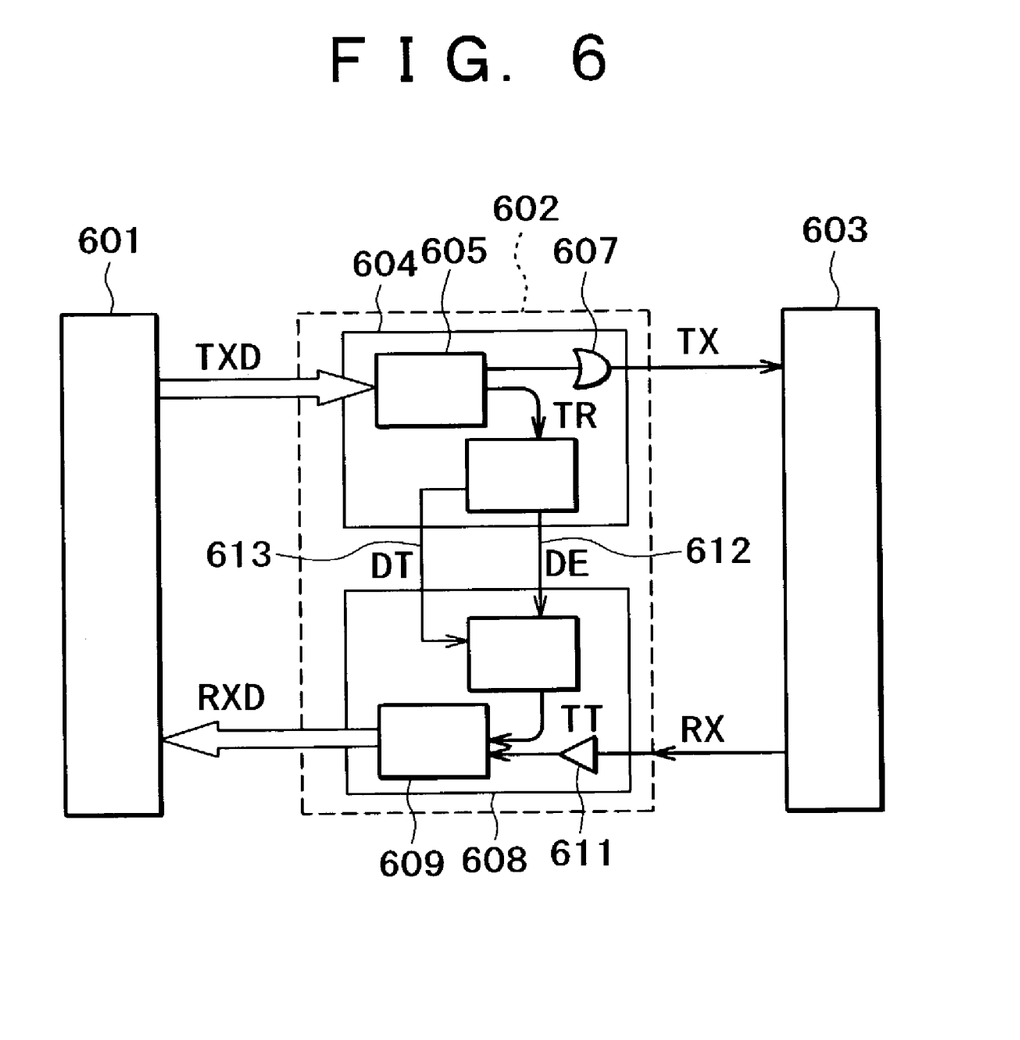
FIG. 6 is a block diagram showing a second configuration of a signal transmit-receive circuit according to the present invention.

FIG. 6 is a drawing showing a second configuration example of a communication device and a signal transmit-receive device according to the present invention. The configuration of the communication device and the signal transmit-receive device, and the configuration of a transmitting circuit and a receiving circuit within the signal transmit-receive device are the same as the above described basic configuration example. In this drawing, a communication device 601 transmits and receives parallel signals, a communication device 603 transmits and receives serial signals, and a signal transmit-receive device 602 performs conversion of parallel signals and serial signals between the two communication devices. In FIG. 6, like FIG. 1, only a loopback test between the communication device 601 and the signal transmit-receive device 602 is shown for simplicity.

In this example, in the signal transmit-receive device 602, the transmitting circuit group and receiving circuit group of a transmitting circuit 604 and a receiving circuit 608 are respectively formed on different s. The transmitting circuit 604 comprises a serializer 605 for converting parallel signals into serial signals, and a transmitting driver 607 for driving serial signals TX, while the receiving circuit 608 comprises an input buffer 611 for receiving serial signals RX, and a deserializer 609 for converting serial signals into parallel signals. During normal communication, that is, during a non-loopback test, a parallel signal TXD transmitted from the communication device 601 is converted into a serial signal TX by the transmitting circuit 604 and transmitted to the communication device 603. Conversely, a serial signal RX transmitted from the communication device 603 is converted into a parallel signal RXD by the receiving circuit 608 and transmitted to the communication device 601.

In this example, a loopback test circuit comprises an error detecting circuit 606 within the transmitting circuit 604, a test signal producing circuit 610 within the receiving circuit 608, a wiring 612 for transmitting error information from the transmitting circuit 604 to the receiving circuit 608, and a wiring 613 for transmitting test signal timing information from the transmitting circuit 604 to the receiving circuit 608. The error detecting circuit 606 compares a test signal pattern defined in advance by the communication device 601 and a receive signal pattern, e.g., on a sequential basis, to detect errors. The error detecting circuit 606 has another function to extract timing information of the test signal pattern. The test signal producing circuit 610 produces a test signal pattern defined in advance by the communication device 601, and can invert any bits of the test signal pattern, based on error information. Also, the test signal producing circuit 610 can control the timing of producing a test signal pattern, based on timing information.

Figure 7:
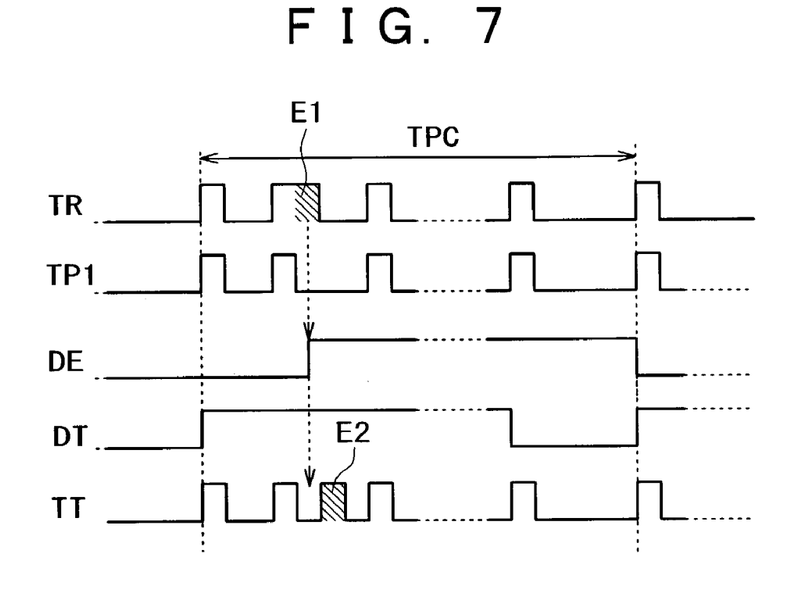
FIG. 7 is a waveform diagram showing a signal timing-relationship during a loopback test on the signal transmit-receive circuit of FIG. 6.

Referring to FIG. 7, a description is made of the operation of a loopback test of the above described second preferred embodiment in a case where information indicating the existence or absence of an error is transmitted from the transmitting circuit 604 to the receiving circuit 608. TP1 denotes a test signal pattern defined in advance by the communication device 601. A signal TR received in the transmitting circuit 604 is compared with TP1 in the error detecting circuit 606, and mismatch between the two, if any, is detected as an error, as indicated by E1. If an error is detected in the error detecting circuit 606, H level is outputted to an error signal DE. The error signal DE is transmitted to the test signal producing circuit 610 of the receiving circuit 608 through the wiring 612. The error detecting circuit 606 extracts a starting time of the test signal pattern and outputs H level to a timing signal DT. The timing signal DT is transmitted to the test signal producing circuit 610 of the receiving circuit 608 through the wiring 613. The test signal producing circuit 610 starts to produce a test signal pattern, based on the timing signal DT from the transmitting circuit 604. When an error signal from the transmitting circuit is L level, the test signal pattern TP1 defined by the communication device 601 is produced. Upon receiving an error signal DE of H level, the test signal producing circuit 610 produces a signal TT in which one bit (E2) in the test signal pattern TP1 is inverted. Since the signal TT is transmitted to the communication device 601, it can be tested by the loopback test whether an error occurs in the loopback route. In the second preferred embodiment, since synchronization can be taken between the test signal pattern received from the communication device 601 and the test signal pattern transmitted to the communication device 601, the test signal patterns appear to the communication device 601 to be equivalent with a conventional loopback signal that loops back a received signal without processing.

Figure 8:
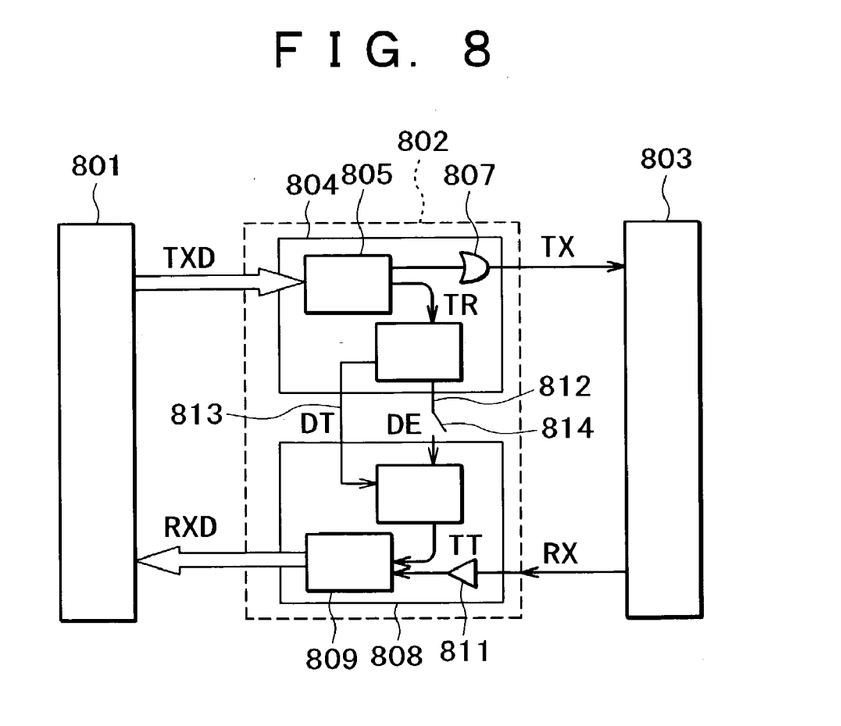
FIG. 8 is a block diagram showing a third configuration of a signal transmit-receive circuit of the present invention.

FIG. 8 shows a third preferred embodiment of a communication device and a signal transmit-receive device according to the present invention. The configuration of the communication device and the signal transmit-receive device, and the configuration of a transmitting circuit and a receiving circuit IC within the signal transmit-receive device are the same as the above described basic configuration. In FIG. 8, a communication device 801 transmits and receives parallel signals, a communication device 803 transmits and receives serial signals, and a signal transmit-receive device 802 performs conversion of parallel signals and serial signals between the two communication devices 801, 803. In FIG. 8, like FIG. 1, only a loopback test between the communication device 801 and the signal transmit-receive device 802 is shown for simplicity.

In this exemplary embodiment, in the signal transmit-receive device 802, the transmitting circuit group and receiving circuit group of a transmitting circuit 804 and a receiving circuit 808 are respectively formed on different ICs. The transmitting circuit 804 comprises a serializer 805 for converting parallel signals into serial signals, and a transmitting driver 807 for driving serial signals TX, while the receiving circuit 808 comprises an input buffer 811 for receiving serial signals RX, and a deserializer 809 for converting serial signals into parallel signals. During normal communication (during a non-loopback test), a parallel signal TXD transmitted from the communication device 801 is converted into a serial signal TX by the transmitting circuit 804 and transmitted to the communication device 803. Conversely, a serial signal RX transmitted from the communication device 803 is converted into a parallel signal RXD by the receiving circuit 808 and transmitted to the communication device 801.

The loopback test circuit of this preferred embodiment comprises an error detecting circuit 806 within the transmitting circuit 804, a test signal producing circuit 810 within the receiving circuit 808, a wiring 812 for transmitting error information from the transmitting circuit 804 to the receiving circuit 808, and a wiring 813 for transmitting test signal timing information from the transmitting circuit 804 to the receiving circuit 808. Whether an error signal can be transmitted from the transmitting circuit 804 to the receiving circuit 808 is controlled by a switch 814. The error detecting circuit 806 compares a test signal pattern defined in advance by the communication device 801 and a received signal pattern, e.g., on a sequential basis, to detect errors. The error detecting circuit 806 has another function to extract timing information of the test signal pattern. The test signal producing circuit 810 produces a test signal pattern defined in advance by the communication device 801, and can invert any bits of the test signal pattern, based on error information. Also, the test signal producing circuit 810 can control the timing of producing a test signal pattern, based on timing information.

Figure 9:
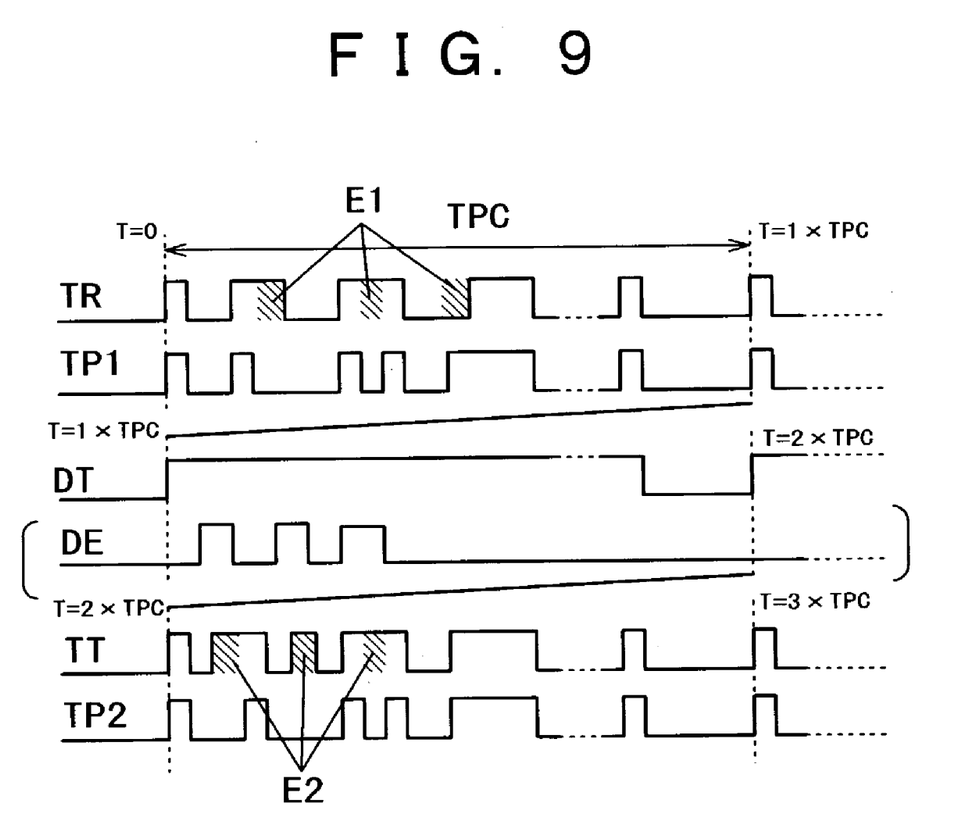
FIG. 9 is a waveform diagram showing a signal timing relationship during a loopback test on the signal transmit-receive circuit of FIG. 8.

Referring to FIG. 9, a description is set forth of the operation of a loopback test in the above described third preferred embodiment in a case where the number of errors is transmitted as error information from the transmitting circuit 804 to the receiving circuit 808. TP1 and TP2 denote test signal patterns defined in advance by the communication device 801. A signal TR received in the transmitting circuit 804 is compared with TP1 in the error detecting circuit 806, and mismatch between the two, if any, is detected as an error (E1), and the number of errors within one cycle of the test signal pattern is counted by a counter of the error detecting circuit 806. In the next cycle of the test signal pattern TP1, an error signal DE in which L and H levels are repeated, for example, by the number of errors, is outputted, and transmitted to the test signal producing circuit 810 of the receiving circuit 808 through the wiring 812. In the example of FIG. 9, there are three errors E1, so that the error signal DE has L and H levels repeated three times. The error detecting circuit 806 extracts a start time of the test signal pattern and outputs H level to a timing signal DT. The timing signal DT is transmitted to the test signal producing circuit 810 of the receiving circuit 808 through the wiring 812. The test signal producing circuit 810 produces a signal TT in which bits (E2) of TP2 are inverted by the number of errors transmitted by the error signal DE. The test signal producing circuit 810 starts to produce a test signal pattern, based on the timing signal DT from the transmitting circuit 804, and produces a signal TT in which bits (E2) of TP2 are inverted by the number of errors transmitted by the error signal DE. Since the signal TT is transmitted to the communication device 801, the number of errors in the loopback route can be obtained by the loopback test. By controlling transmission of the error signal from the transmitting circuit 804 to the receiving circuit 808, whether the errors occurred in the receiving side or the transmitting side can be determined. This is effective for fault measures during a loopback test. In FIG. 9, a difference in time relationship among signals (TR, TP1), DE, and (TT, TP2) is shown, as indicated by time T. The time scale of the signal DE is set shorter than that of other signals.

As shown by the above described preferred embodiments, according to the present invention, in comparison with the conventional loopback method that loops back a received signal without processing, the transmission speed of a signal transmitted from the transmitting circuit to the receiving circuit can be set lower. As a result, the number of high-speed input-output circuits within the transmitting circuit and the receiving circuit can be reduced, contributing to reduction in power consumption.

Although the above described examples show a transmit-receive device that performs serial-to-parallel conversion between two communication devices, the present invention can apply also to a transmit-receive device that performs conversion between signals having a parallelism factor of n ($n \geq 1$) and signals having a parallelism factor of m ($m \geq 1$).

During a loopback test, only a signal having an error signal is transmitted from a transmitting circuit to a receiving circuit IC, instead of looping back transmit-receive signals without processing. As a result, the number of high-speed signal lines and pins for connecting the transmitting circuit and the receiving circuit can be reduced, contributing to reduction in installation costs. Also, the number of high-speed input-output circuits within the transmitting circuit and the receiving circuit can be reduced, contributing to reduction in power consumption.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A signal transmit-receive device that performs mutual conversion of parallelism factor of signals between communication devices to perform transmission and reception, the transmit-receive device comprising:
   a first signal converter converting signals, inputted from a first communication device and having a parallelism factor of n (n≧1), into signals having a parallelism factor of m (m≧1);
   a data transmitting circuit transmitting the converted signals to a second communication device;
   a data receiving circuit receiving signals transmitted from said second communication device and having a parallelism factor of m;
   a second signal converter converting signals received in said receiving circuit into signals having a parallelism factor of n to provide the converted signals to said first communication device;
   an error detecting circuit determining, when a first test signal is inputted to said first signal converter, whether an error exists in outputs of said first signal converter or not;
   a loopback means for transmitting an error detection result of said error detection means to data receiving side at a data transfer rate lower than that of said data transmitting circuit; and
   a test signal generation circuit generating a second test signal reflecting the transmitted error detection result and inputting the second test signal into said second signal converter to converting the parallelism factor of the second test signal and to provide said first communication device with the converted second test signal as a loopback test result.

2. The signal transmit-receive device according to claim 1, wherein said error detecting circuit detects the positions of error bits in the outputs of said first signal converter, the error detection result transmitted via said loopback means contains information of detected error bit positions, and said second test signal is generated so as to contain the same error bit positions compared with the first test signal inputted to said first signal converter.

3. A loopback test method for testing total function of transmitting circuit connected to a communication device, which converts parallelism factor of signals to be transmitted and transmits the converted signals to an external device, and of receiving circuit connected to the communication device, which receives signals from the external device and reconverts parallelism factor of the received signals and provides the communication device with the reconverted received signals, without using said external device, the loopback test method comprising the steps of:
   instead of the signals to be transmitted, inputting a first test signal to the transmitting circuit to convert parallelism thereof;
   evaluating a transmit state of the converted first test signal in the transmitting circuit;
   transmitting an evaluation result signal based on the evaluation from the transmitting circuit to the receiving circuit;
   generating a second test signal in the receiving circuit in response to the transmitted evaluation result signal, wherein said second test signal is a copy of said first test signal when the evaluation result signal indicates a correct transmission, and wherein said second test signal is a signal modified from said first test signal when the evaluation result signal indicates a transmission error; and
   reconverting in said receiving circuit parallelism factor of the second test signal, instead of signals received from the external device, to provide the reconverted second test signal to said first communication device as a loopback test result.

4. The loopback test method according to claim 3, wherein, in the evaluating step, the transmitting circuit compares the converted first test signal with a known correct pattern of said first test signal to evaluate a transmit state of the test signal.

5. The loopback test method according to claim 3, wherein, in the evaluation step, a data size of the evaluation result signal is smaller than that of the first test signal.

6. The loopback test method according to claim 3, wherein, in the evaluation step, the data transfer rate of the evaluation result signal is lower than that of data transmission from said transmitting circuit to said external device the test signal.

* * * * *